Patented Oct. 13, 1925.

1,556,772

UNITED STATES PATENT OFFICE.

TOSHIICHIRO ENDO, OF IWAKI-GUN, FUKUSHIMA-KEN, JAPAN.

PROCESS OF MANUFACTURING SEASONINGS OR LIKE FOODSTUFFS FROM FISH OR SHELLFISH.

No Drawing.   Application filed July 19, 1922.   Serial No. 576,127.

*To all whom it may concern:*

Be it known that I, TOSHIICHIRO ENDO, a subject of the Emperor of Japan, residing at No. 13 Aza-kashi, Oaza-nakanosaku, Ena-mura, Iwaki-gun, Fukushima-ken, Japan, have invented new and useful Improvements in Processes of Manufacturing Seasonings or like Foodstuffs from Fish or Shellfish, of which the following is a specification.

The present invention relates to a process of manufacturing seasonings or like food stuffs from fish or shellfish, and the object thereof is to obtain by a simple and economical means such seasonings or like food stuffs as are palatable, digestible, and perfectly free from offensive odors peculiar to fish or shellfish.

Processes as hitherto known for manufacture of such seasonings or like food stuff are either to reduce the material to powder after drying, with or without previous boiling, or to boil it down, the material being previously pickled, and to pulverize the decoction after evaporating and drying the same, or to make sauces from the said decoction. But the preparations obtained by these processes are not good for the table, they having strong odors peculiar to fish or shellfish.

The applicant has discovered that fish or shellfish can be deprived of its peculiar odor and be made palatable as well as digestible by cultivating therein aspergillus oryzæ by any suitable means, thus converting the same finally into "koji"; and from this discovery he has been enabled to prepare excellent seasonings or like food stuffs from the said materials.

A practical example of the present invention is shown below.

According to my invention, the flesh alone of fish or shellfish is used as material. Such material is converted into "koji" by cultivating aspergillus oryzæ therein, sometimes with admixture of parched rice-bran, or bean refuse remaining after albuminous matters have been extracted therefrom or any dried cereal parched and reduced to grits or powder, and out of these preparations various seasonings or like food stuffs are produced.

(1) When to treat fish or shellfish without any admixture.

Raw fish or shellfish used, is first deprived of all its bony part, entrails, shell, etc. and only the fleshy part is then boiled or steamed after washing with water. The same is then pressed to squeeze out the water and oil. After sprinkling thereon a small quantity of 0.5% sulphuric acid, it is left to cool down to about 40° C., when it is sprinkled over with spores of aspergillus oryzæ without any admixture and then put in small flat boxes, which are then piled up and stored away in a hot house. After the lapse of about 20 hours when aspergillus oryzæ begins to grow and the temperature rises to about 38°–40° C., stir up the same by hand and regulate the temperatures of the boxes, changing suitably their arrangement, so as to make the growth of aspergillus oryzæ uniform. After 7–10 hours, its temperature rises to 38°–40° C., and the contents of the boxes are again stirred up and the arrangement of the boxes is altered. In this way, the material will be perfectly converted into "koji" in 60–75 hours after the same is put in the hot house.

The fish or shell fish thus converted into "koji" may preferably be dried for 2–10 days.

Another process is to cut the material into fine pieces by means of a masticator, and treat it according to this invention.

When dried fish or shellfish is used as material, it is bruised into pieces of suitable sizes and steeped in 0.5% sulphuric acid for about five hours. The same is then steamed and left to cool; at about 40° C. spores of aspergillus oryzæ are sprinkled over it, and the process of turning the same to "koji" is carried on, during which care must be taken to prevent excessive rise of the temperature before stirring and to keep good ventilation.

(2) When to treat fish or shellfish mixed with rice-bran, or bean refuse remaining after extracting albuminous matters, or any cereal powder, or the like.

Fish or shellfish is washed with water as in the case (1) and then boiled or steamed. After eliminating water and oil therefrom, a .7% solution of lactic acid is sprinkled thereon and there is added thereto parched rice-bran, or dried bean refuse, or any other powder of cereal, at a rate of about 30 grams per 100 grams of the material, and then the process of turning the same to "koji" as described above is carried on. Another process is to take about two-thirds of the parched rice-bran to be used and to add the same to the fish or shellfish flesh. Then the mixture is crushed and kneaded and formed into lumps of 2-3 c. m. in diameter and 3-4 c. m. in length. After cooling the same to about 30° C., cover the same with the remaining one third of the parched rice bran mixed with spores of aspergillus oryzæ. Wrap them with a straw mat, and store it away in a hot house, keeping the temperature of the room at about 25°-30° C. After the lapse of about ten hours, aspergillus oryzæ begins to sprout and breed. By stirring up the same two or three times at suitable opportunities, keeping the room well ventilated and maintaining the temperature at about 33°-34° C. the process is completed. The product is taken out and dried in a drying chamber or by means of any other drying apparatus.

The "koji" thus obtained and dried is boiled with water, and the decoction may be concentrated by vacuum evaporation into extract or may be reduced to powder by further drying, and food seasoning is prepared. The said "koji" may also be mixed with salt water of Baumé 20° and manufactured into soy or sauce, or may be added to materials when to manufacture "miso."

Claims:

1. A process of manufacturing food stuffs, which consists in heating animal flesh in the presence of water, squeezing out water and oil therefrom, sprinkling a dilute acid solution thereon mixing therewith spores of aspergillus oryzæ, converting the same into "koji" by breeding the fungus in a hot house, and then decocting the "koji."

2. A process of manufacturing food stuffs, which consists in steaming animal flesh, forming it into small lumps after squeezing out water and oil therefrom sprinkling a dilute acid solution thereon and mixing it with cereal refuse and converting said lumps into "koji" in a hot house by covering them with spores of aspergillus oryzæ.

In testimony whereof I have signed my name to this specification.

TOSHIICHIRO ENDO.